United States Patent Office 3,428,077
Patented Feb. 18, 1969

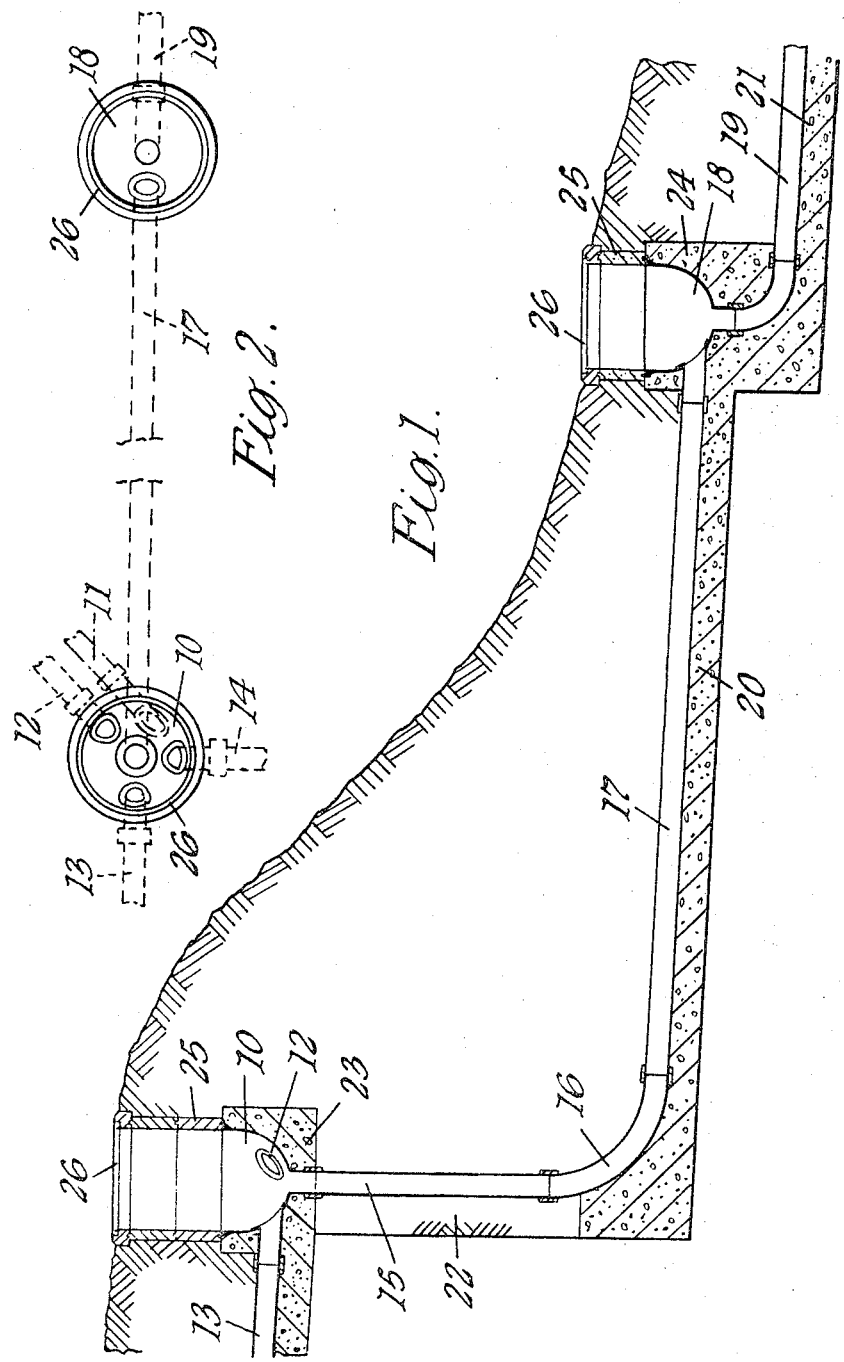

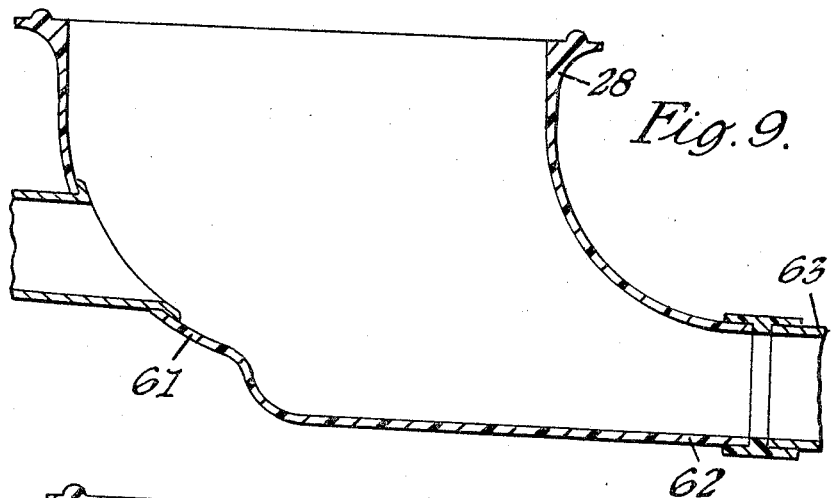
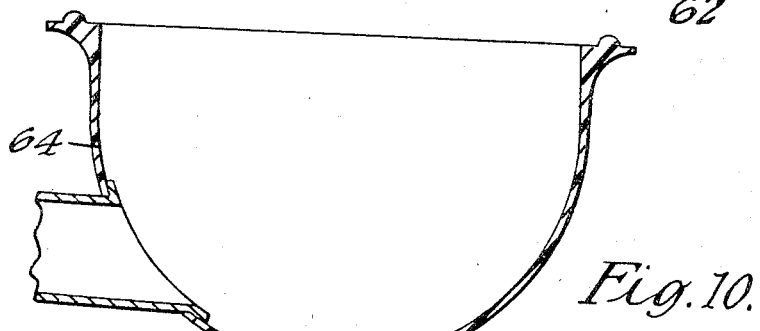
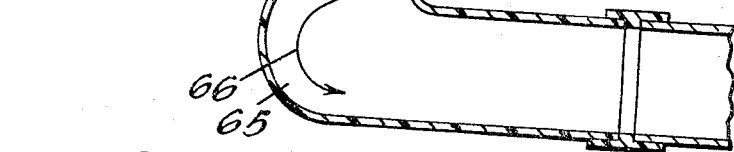
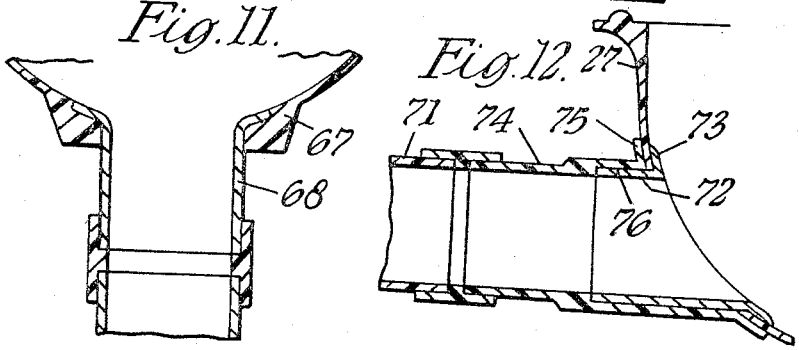

3,428,077
SOIL AND SURFACE WATER DISPOSAL SYSTEM
Peter Noel Henry Scarfe, Bramley, England, assignor to Marscar Limited, London, England, a British company
Filed June 8, 1966, Ser. No. 556,232
Claims priority, application Great Britain, June 9, 1965, 24,462/65; July 26, 1965, 31,836/65
U.S. Cl. 137—363
Int. Cl. F16l 5/00; E02b 11/50; E02d 27/38
5 Claims

ABSTRACT OF THE DISCLOSURE

A soil or surface water disposal system in which access for rodding purposes is afforded by means of an access pit having connected to it one or more inflow pipes and an outflow pipe, the access pit having a part-spherical portion which co-operates with end portion means on the inflow pipe to permit the inflow pipe to be secured to the pit at any desired angle of approach, an aperture being formed in the pit at the region of connection to the inflow pipe.

---

Figure 3:
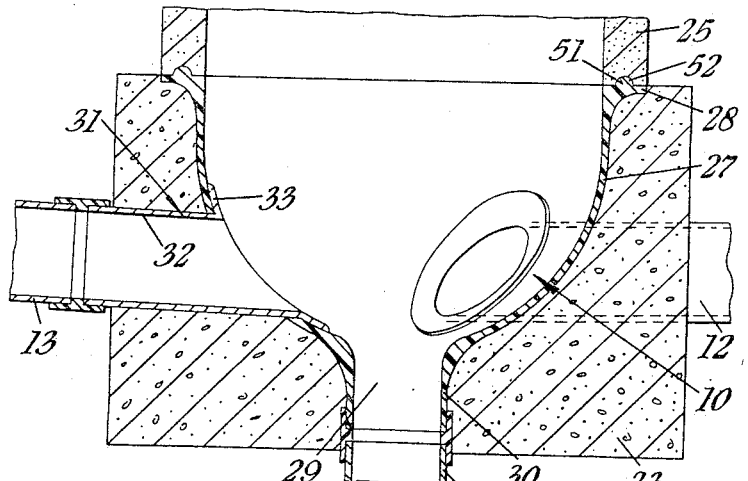

This invention relates to soil or surface water disposal in buildings and to the ware or components therefor.

An object of the present invention is to provide an improved system of soil or surface water disposal which involves substantial economies in cost of materials.

A further object of the present invention is to provide improved soil or surface water disposal which involves substantial economies in cost of materials.

A further object of the present invention is to provide improved soil or surface water disposal ware the installation of which provides substantial economies in time and also greatly reduces the number of stock items of ware at present required.

The soil or surface water disposal system, according to the present invention and the ware therefor, has been evolved in order to avoid the disadvantages and high costs of conventional masonry manholes.

The present invention consists in a water disposal system of the type including at least one access pit, and an inlet and an outflow pipe each having an end connected to said access pit, characterised in that said access pit comprises a shell preferably composed of plastic material and having a part-spherical portion, and the end of said inlet pipe connected to said access pit has end portion means shaped to conform to the shape of said part-spherical portion whereby said inlet pipe is secured to any selected region of said part-spherical portion at any selected orientation to give a desired angle of approach of the inflow pipe to the pit, an aperture being provided in the said part-spherical portion at the said selected region.

The invention further consists in an access pit for a soil or surface water disposal system as set out in the preceding paragraph, comprising a bowl having at least a portion of its surface of part-spherical shape, preferably of hemispherical shape and preferably composed of reinforced plastic material, a centrally disposed outflow orifice providing or adapted to contain a pipe or spigot for connection to an outflow drainpipe, and one or more inflow drain pipe connector means each comprising a connector sleeve, (preferably composed of plastic material), adapted at one end to be connected as a spigot to an inflow drain pipe, and having at the other end an external flange shaped to conform with the part-spherical surface of the said bowl, the arrangement being such that the external flange of the connector sleeve may be secured (as by adhesive or other means) to the said bowl around an opening formed during installation in the bowl wall at any chosen inlet point on the part-spherical surface to give a desired angle of approach of the inlet pipe to the bowl.

In a preferred form according to the present invention, the spigot end of the connector means is passed from the inside of the bowl through the opening formed at the chosen inlet point in the bowl wall such that the flanged end of the connector means engages upon the inner part-spherical interior surface of the bowl wall and may be fixed there by adhesive, solvent welding or other means.

Summarising the objects and advantages of the invention as set out above, the soil and surface water disposal system, and the access pit therefor, (1) Does not require manholes, thus eliminating labour and materials therefor;

(2) Allows the planning of the system to bring all access pit invert levels to, or close to, the ground surface;

(3) Permits all underground drain runs to be rodded (i.e. cleaned) from ground level;

(4) Enables the necessary ware, including the access pits, to be prefabricated by mass production methods;

(5) Permits the entry to the pit of any inlet pipe (a) at any angle through 360° around the vertical axis of the pit where the pit has a central vertical outlet, and (b) at any angle through about 135° where the pit has a central horizontal outlet, instead of only the 16 set angle alternatives available heretofore in conventional manhole design.

(6) Eliminates any possible hydrodynamic interference with any of the inflows, since where the direction of the outflow is vertical, the direction of the inflows one to another and to the outflow is immaterial;

(7) Enables a drainlayer to assemble considerable lengths of drain complete with access pit on the ground and subsequently to place the entire assembly at the desired gradient into a previously prepared trench;

(8) Reduces the cost of the average domestic soil and surface water drainage system by as much as two thirds.

(9) Provides greatly reduced liability to fracture or leakage of the system due to the use of plastic components;

(10) Provides strong lightweight plastic ware, the components of which are cheap to transport or store and are relatively unbreakable;

(11) Greatly facilitates the testing of drain runs during construction (and subsequently) from ground level using known means and equipment;

(12) Eliminates the necessity for tumblers;

(13) Reduces the velocity of waste matter and liquids at the point of entry to the access pit and increases the velocity of such waste at the point of exit from the access pit, thus preventing accumulation of matter in the access pit during peak usage, this being the complete reversal of existing methods using tumblers;

(14) Can be used, or adapted to be used, with any existing drain pipes.

Figure 4:
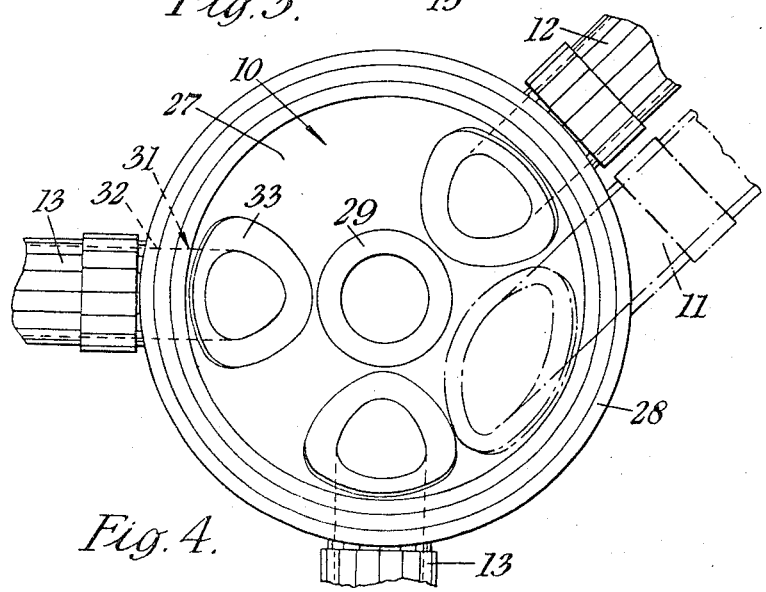
Figure 5:
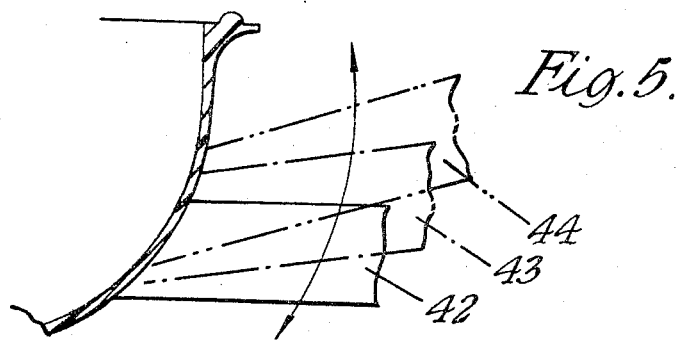
Figure 6:
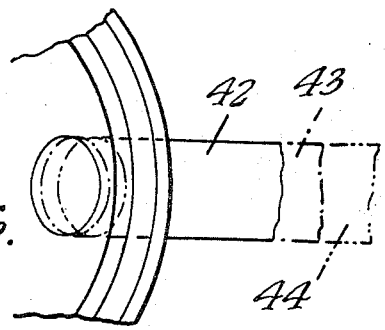
Figure 7:
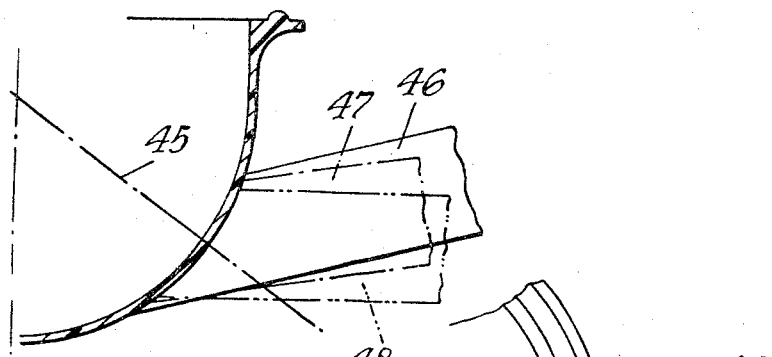
Figure 8:
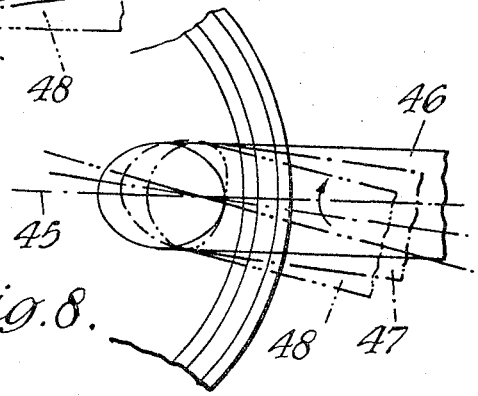

In the accompanying drawings:

FIGURE 1 is a vertical section through a soil or surface water disposal system according to the present invention, FIGURE 2 is a plan view of the system of FIGURE 1, FIGURE 3 is a vertical section through an access pit according to the present invention, FIGURE 4 is a plan view of the pit of FIGURE 3, FIGURES 5 and 6 are partial elevation and plan views respectively showing diagrammatically the possible adjustments of the position of an inlet pipe in relation to the access pit, FIGURES 7 and 8 are similar views showing further possible adjustments of the position of the inlet pipe, FIGURE 9 is a vertical section through an alternative form of access pit according to the present invention, FIGURE 10 is a vertical section through a further alternative form of access pit according to the present invention, FIGURE 11 is a detail showing modification to the outflow connection of FIGURE 3, and FIGURE 12 is a detail showing a modification to the inflow connection of FIGURE 3.

In carrying the invention into effect according to one convenient mode by way of example, FIGURES 1 and 2 show a soil or surface water system which includes a first access pit 10 having four inlet pipes 11, 12, 13 and 14 and an outflow connected first to a vertical straight length 15 of drain pipe followed by a curved portion 16 connected to a further straight length which leads into a second access pit 18. The second pit 18 has an outflow connected to a further length 19 of drain pipe leading to a further access pit or the main sewer (not shown).

It will be apparent that with this arrangement, a drain run of any desired gradient may be achieved, not as in conventional practice by digging down a manhole to site its channel at the desired invert level, but by siting the access pit at or adjacent ground level and leading down a pipe from the outlet of the access pit to the desired level so that the run to the next access pit or main sewer can be achieved at the desired gradient in any required direction radially through 360° around the vertical axis of the pit.

Therefore whilst a trench must be dug having much the same profile as for conventional drainage systems, its dimensions are smaller within practical limits, and manhole construction is replaced by an access pit which merely requires limited concrete bedding. Each access pit together with its outflow connector and straight and curved drain pipes to the extent of the next access pit, is placed as a complete assembly in the previously prepared trench and embedded in wet concrete, as at 20 and 21, along the length of the near horizontal runs 17 and 19, without the drainlayer having to enter the trench.

When the concrete has set, inlet connector sleeves are fixed to the access pit in the manner to be described more fuly hereinafter.

The vertical pipe run 15 is back filled as at 22 with consolidated soil, stabilized soil or aggregate or concrete as desired, and the access pit with its various inlet pipes 11 to 14, or 17, is set in concrete 23 or 24 and provided (where necessary) with extension surrounds 25 and a suitable removable cover 26 as with a conventional manhole.

In siting or laying out the soil or surface water disposal system, positions for the first and last access pits are chosen adjacent the building and the boundary of the property respectively, as for conventional manholes in the known system. According to the lie of the land, to the distance between the first and last access pits, and to the invert level of the main sewer, one or more intermediate access pits may be required as would be extra manholes in the conventional system.

FIGURES 3 and 4 show in more detail the construction of the access pit 10 which comprises a hemispherical bowl or shell 27 having a peripheral outward flange 28 in the diametric plane. Centrally disposed in the wall of the bowl 27 is an aperture 29 for the bowl outflow in which is integrally formed a vertically disposed outlet sleeve or pipe 30.

The radius of the bowl hemisphere may be conveniently 9″, but may be larger to cater for larger-sized pipes, (or a greater number of small inlet pipes) and the outlet sleeve 30 may be for drain pipes of 3″, 4″, 6″, 9″, 12″, 15″, 18″, and so on.

The bowl 27 is preferably composed of a tough reinforced plastic having sufficient rigidity to maintain its shape during use storage and transportation.

Before installation in the system, no inlet apertures exist for inflow to the access pit bowl, these apertures being made manually in the wall of the bowl after it is in situ and the appropriate angle of entry assessed for each individual inlet pipe.

Each inlet pipe, such as 13, is connected to the bowl 27 by means of a connector sleeve 31 which comprises a short pipe length 32 composed of any suitable plastic for drainware but preferably of the same material as the bowl and of suitable diameter having at one end portion means in the form of an external peripheral flange 33 which is dished i.e. partspherical to correspond to the curvature of the internal part-spherical surface of the bowl. The dished flange 33 is inclined at an appropriate angle (say 30°–45°) to the axis of the pipe length 32 i.e. the axis of flange 33 intersects the axis of pipe length 32 at an angle of between 45° and 60° so that, for example, when the connector is placed with its flange against the exterior surface of the bowl, as near the bottom of the bowl as possible, with the axis of the pipe length 32 passing through the axis of the outlet sleeve 30, the axis of the pipe length 32 is substantially horizontal. From this position, the connector can be moved over the surface of the bowl, the flange and the bowl co-operating in the manner of a ball and socket joint, to allow any position of the connector to be chosen which will cause the connector sleeve 31 to be set at the required gradient of the inlet pipe 13, regardless of the angle of approach.

When the desired positon has been chosen, an aperture is formed in the bowl wall, the connector is passed from the inside of the bowl through the aperture, and the flange 33 is secured to the interior surface of the bowl wall surrounding the aperture with the aid of an adhesive or other suitable means.

With this arrangement, extreme flexibility is given to the otherwise difficult operation of securing to the access pipe an inlet pipe approaching it at a given angle from a given direction.

This feature will be readily apparent from a consideration of FIGURES 5 to 8 of the accompanying drawings.

FIGURES 5 and 6 show that by sliding the dished flange of the connector over the surface of the bowl in the vertical plane indicated as 41 in FIGURE 6 (being the plan of FIGURE 5) any gradient may be offered in the inlet pipe as shown by the three examples 42, 43, and 44, of alternative positions for the inlet pipe.

However, it may well be that selection of a given gradient in this way results in the junction with the bowl being too low on the bowl for the intended path of the inlet pipe.

In this case, it is preferred to alter the bearing (i.e. the direction in the horizontal plane) of the inlet pipe so that it lies in a vertical plane which does not pass through the central vertical axis of the bowl. The inlet pipe can thus be regarded as "tangential" as for example the pipe 11 in FIGURE 3.

The height of the junction with the bowl is chosen first and the connector is then rotated about the radius of the bowl from a position 46 to various other positions such as 47 and 48 until the gradient is reduced to that as desired.

Since this rotation also causes the bearing of the connector to be altered, it will be appreciated that a certain amount of trial and error will be necessary to achieve the best location from the connector, but due to the flexibility of the system no difficulty should be experienced in doing this.

When the access pit is disposed below ground level, as in FIGURE 1, the pit is provided with one or more extension surrounds 25 each comprising a tubular component having an internal diameter of at least that of the access pit bowl. The surround 25 may conveniently be made of concrete, and it has an annular chase 51 extending circumferentially around one end face and a corresponding annular rib extending around the opposite end face to provide centering engagement when two extension surrounds are axially superimposed and to provide centering engagement with the pit bowl by means of an annular rib 52 on the flange 23 of the bowl.

The wall thickness of the extension surround may be of the order of two inches (and the flange 28 of the bowl 27 is preferably of the same width) and its axial length or height is conveniently of the order of eight inches.

FIGURE 9 shows an alternative form of access pit 61 in which the bowl is part-spherical and sweeps off in the form of a funnel into an integral central horizontal outlet pipe 62 for the outflow. It will be appreciated that this form of pit must be used when the pipe 63 must extend near horizontally away from the pit without first extending downwardly as pipe 15 in FIGURE 1 and without extending in a gradual curve as from pit 18 in FIGURE 1.

However, this form of pit does have the disadvantage that its part-spherical surface free to co-operate with the dished flange 33 of a connector is less than a hemisphere. In fact, the surface available extends for about 135° around the vertical axis of the pit on the side remote from the outlet pipe 62. Nevertheless, this still represents a useful area in which to choose the position of one or more inlet pipes.

Where the outlet pipe can be situated at a slightly lower level, the further alternative form of access pit 64 shown in FIGURE 10 is to be preferred since the disadvantage referred to above is eliminated. In this form, a horizontal outlet pipe located below the bowl is provided with a curved end portion 65 which is shaped to assist outflow in the manner indicated by arrow 66.

FIGURE 11 shows an alternative form of access pit 67 in which the outlet sleeve or pipe is preformed as a separate component in the form of a sleeve 68 fixed in a central aperture in the bowl.

FIGURE 12 shows an alternative way of connecting an inlet pipe 71 to the bowl 27 in which the connector means is formed in two parts consisting of an inner pipe 72 having a dished flange 73 and an outer pipe 74 having a dished flange 75 and a counter-bore 76 which accommodates the end of the pipe 72. With this arrangement, the peripheral portion of the bowl wall surrounding the aperture is secured between the two dished flanges 73 and 75.

I claim:

1. A water disposal system of the type including at least one access pit, and an inlet and an outflow pipe each having an end connected to said access pit, characterised in that said access pit comprises a shell composed of plastic material and having a part-spherical portion, and the end of said inlet pipe connected to said access pit has end means having a continuous surrounding peripheral portion with a radius of curvature shaped to conform to the shape of said part-spherical portion whereby said inlet pipe is secured to any selected region of said part-spherical portion at any selected orientation to give a desired angle of approach of the inflow pipe to the pit, an aperture being provided in the said part-spherical portion at the said selected region.

2. In a water disosal system of the type including at least one access pit composed of plastic material and an inlet pipe and an outflow pipe connected to the said access pit, the improvement comprising an access pit including a part-spherical portion, at least two inlet pipes having end portion means connecting the respective pipe to the part-spherical portion, and apertures in the part-spherical portions within the means connecting, said end portion means defining a closed figure lying on a sphere whose radius of curvature is the same as the radius of the part-spherical portion, whereby the inlet pipes are secured to the bowl at any desired angle of approach of each of the inflow pipes to the pit.

3. A soil or surface water disposal system which includes at least one access pit, at least two inlet pipes connected to said access pit from at least one building, an outflow drainpipe connected centrally to and extending from said access pit to discharge to a main sewer, at least a part-spherical portion defined on said access pit, end portion means located upon each of said inlet pipes in the form of a closed path lying on the same sphere as said part-spherical portion whereby said end portion means closely engages said part-spherical portion continuously over the entire closed path, means securing said end portions means to said part-spherical portion, and apertures defined in said part-spherical portion, each aperture placing the interior of one of said inlet pipes in communication with the interior of said pit, whereby the position of connection of each inlet pipe to the part-spherical surface is chosen to give any desired angle of approach of the inlet pipe to the pit.

4. A system according to claim 3, wherein each of said end portion means is defined by an external flange provided upon one of said inlet pipes, said flange having a part-spherical surface secured to said part-spherical portion of said pit.

5. A system according to claim 3, wherein said end portion means has an axis which intersects the axis of its associated inlet pipe at an angle of between 45° and 60°.

References Cited

UNITED STATES PATENTS

| | | | |
|---|---|---|---|
| 417,003 | 12/1889 | Daly | 61—10 X |
| 709,395 | 9/1902 | Cook | 137—356 X |
| 725,793 | 4/1903 | Suddath | 61—10 |
| 1,044,417 | 11/1912 | Raggio | 52—198 |
| 1,209,800 | 12/1916 | Barber | 137—236 |
| 1,772,214 | 8/1930 | Gandillon | 137—356 X |
| 2,153,789 | 4/1939 | Carswell et al. | 61—10 X |
| 2,832,202 | 4/1958 | Norum | 61—14 |
| 2,887,759 | 5/1959 | Brownell | 52—169 X |
| 3,221,881 | 12/1965 | Weiler et al. | 52—169 X |

FOREIGN PATENTS 14,289 1908 Great Britain.
1,054,246 10/1953 France.

EARL J. WITMER, *Primary Examiner.*

U.S. Cl. X.R.

61—10; 52—169